United States Patent Office 3,169,355
Patented Feb. 16, 1965

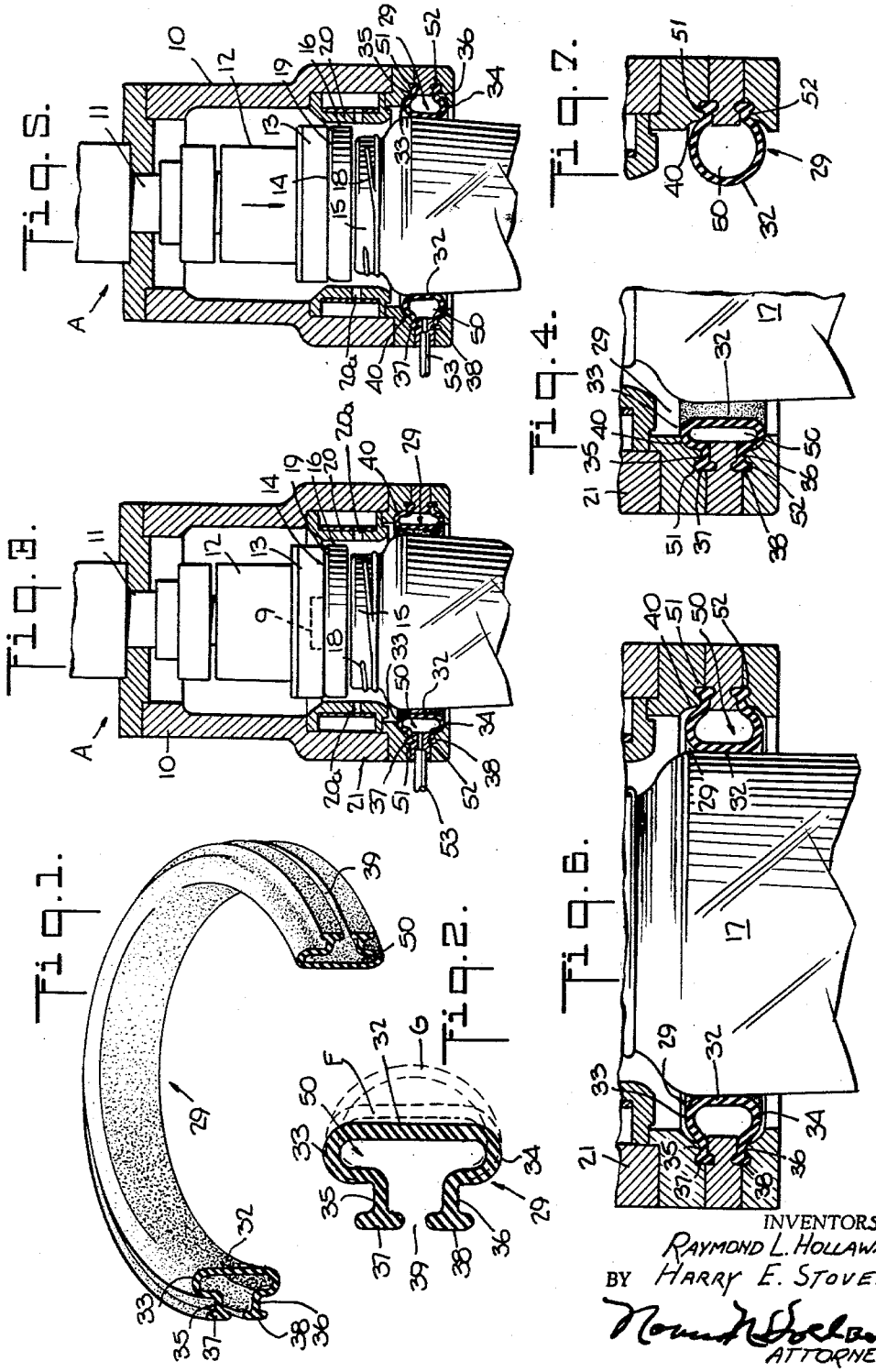

3,169,355
CONTAINER SEALING MECHANISM
Raymond L. Hollaway and Harry E. Stover, Lancaster, Ohio, assignors to Anchor Hocking Glass Corporation, Lancaster, Ohio, a corporation of Delaware
Filed Aug. 7, 1963, Ser. No. 300,463
1 Claim. (Cl. 53—88)

The present invention relates to the sealing art and more particularly to an improved container sealing machine having a sealing head which is provided with a hollow inflatable bladder adapted to cooperate with a container while air is being evacuated from the container.

Foodstuffs are usually packaged in containers under conditions approximating a vacuum. Sealing machines for applying closure caps to containers are adapted to evacuate air from the headspace between the food in the container and the upper rim of the container and to replace the air with an inert gas or a condensable vapor. Thereafter the sealing machine is adapted to apply a closure cap to the container to form a hermetically sealed package.

In order to permit air to be evacuated from the headspace and to prevent air from entering the container, a sealing ring, made of rubber or some other suitable material is provided on the sealing head which contacts the outer walls of the container in order to seal the inner portion of the sealing head from the outer atmosphere.

Such sealing rings have heretofore been made of solid rubber materials, such as sponge rubber and the like, and have also been made in the form of hollow inflatable bladders. However, solid rubber sealing rings tend to wear out and deform and are thus unsatisfactory.

Inflatable bladders which have been in use comprise a hollow ring, usually made of rubber or some other suitable substance, which is adapted to be inflated by a fluid, such as air, injected therein to push the bladder against the side walls of the container and form a seal. In such inflatable bladders, the walls thereof are stretched (similar to the stretching that occurs in inflating a balloon) in order to cause the walls of the bladder to bear against the outer walls of the containers. The stretching of the walls of the bladder, together with the friction produced in bearing against the wall of the container, tends to reduce the life of such bladders.

In addition in order to stretch the bladder, fluids at high pressure are injected therein. It has been found that if a sealing head has no container, or if a container is broken, the bladder is not supported by the wall of the container and the pressure of the fluid injected into the bladder sometimes blows out the bladder.

The present invention overcomes these defects and has for one of its objects the provision of an improved inflatable bladder which has a longer life.

Another object of the present invention is the provision of an improved inflatable bladder which may operate at lower pressures than heretofore possible.

Another object of the present invention is the provision of an improved inflatable bladder in which the rubber walls thereof are not stretched when it is inflated by a fluid.

Another object of the present invention is the provision of an improved inflatable bladder which will not blow out if there is no container in the sealing head.

Another object of the present invention is the provision of an improved sealing machine in which the sealing head thereof has an improved inflatable bladder.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a perspective view broken away showing an inflatable bladder made in accordance with the present invention;

FIG. 2 is a sectional view of the inflatable bladder of FIG. 1 showing the position of the bladder under various operating conditions;

FIG. 3 is a sectional view of a sealing head showing the position of the inflatable bladder and the container before the air is evacuated from the headspace;

FIG. 4 is an enlarged detail showing the shape of the inflatable bladder in its inoperative position;

FIG. 5 is a sectional view similar to FIG. 3 showing the position of the inflatable bladder while air is being evacuated from the headspace of a container;

FIG. 6 is an enlarged detail of FIG. 5 showing the shape of the inflatable bladder during the air evacuating operation; and FIG. 7 is a detail showing the shape of the inflatable bladder when no container is under the sealing head.

As is well known in the art, a hermetically sealed package comprises a container 17 and a closure cap 16 applied thereto. The container 17 is provided with a finish 15 comprising a plurality of lug-engaging threads 18.

The closure cap 16 has the usual cover portion 14 and a depending skirt portion 19. The skirt portion 19 is provided with locking lugs (not shown) adapted to cooperate with the threads 18 of the container finish 15. In applying the closure cap 16 to the container 17, a torque is applied to the cap which causes the locking lugs on the cap to cooperate with the threads 18 on the container finish to hold the cap on the container.

While for convenience of description the present invention will be described in connection with a sealed package wherein a closure cap has locking lugs and is rotated in order to be applied to the container (i.e. the lugs of the closure cap cooperate with the threads of the container finish) it will be understood that the present invention is also adapted to be used in connection with sealed packages which are sealed with other types of caps, such as press-on closure caps, etc.

The container 17 is filled with foodstuff usually to a level below the rim of the container to provide a so-called "headspace" between the top of the contents in the container and the rim of the container. Before the closure cap is applied to the container 17, air is evacuated from the headspace and either an inert gas or a condensable vapor is substituted therefor. If desired, air can be withdrawn from the headspace to form a vacuum without substituting a condensable vapor or inert gas.

FIGS. 3 and 5 show a sealing head A which may be used with the present invention. The sealing head A comprises a sealing hood 10 having a spindle 11 extending therewithin and a plunger 12 mounted on the spindle 11. A friction shoe or boot 13 is mounted at the lower edge of the plunger 12 and is adapted to apply a torque to the closure cap 16 in order to apply the closure cap to the container 17 as pointed out above.

Located within the friction boot 13 is a magnet 9 (shown in broken lines in FIG. 3) which is adapted to hold the closure cap 16 in an elevated position until the cap is to be applied to the container 17.

The sealing head A is provided with a fluid distributing ring 20 having openings 20a therein, which is adapted to introduce either the inert gas or a condensable vapor into the headspace of the container after the air has been evacuated therefrom. In order to seal the inner chamber of the sealing head 10 during the evacuation of the air, a hollow inflatable bladder 29 is provided below the distributor ring 20.

The hollow inflatable bladder 29 is in the form of a hollow ring and has its interior 50 connected to a source of fluid, such as air under pressure, by conduit 53. After a container is placed beneath the sealing head 10, a fluid under pressure, such as air, is injected into the hollow bladder 29 through conduit 53 to re-shape the air bladder so that its outer wall 32 impinges against the side walls of the container 17 as shown in FIGS. 5 and 6. This creates a seal with the container which permits air to be evacuated from the headspace of the container and to be replaced with an inert gas or a condensable vapor without any danger of air being re-admitted.

The preferred construction of the inflatable bladder 29 of the present invention is shown in greater detail in FIGS. 1 and 2. The inflatable bladder 29 comprises an outer wall 32 which is substantially straight when the bladder is at rest, upper and lower curved portions 33 and 34 which are provided with upper and lower rearwardly extending flanges 35 and 36 respectively. The flanges 35 and 36 have beads 37 and 38, respectively, extending therefrom which are preferably spaced from each other to form an elongated inlet 39. The beads 37 and 38 are mounted within correspondingly shaped cavities 51 and 52, respectively, in the lower walls of the sealing head 10 and the curved portions 33 and 34 are mounted in a curved groove 40 in the sealing head when the bladder 29 is at rest.

The inflatable ring is preferably made of a resilient material, such as rubber or some other similar substance, which will be flexed outwardly when a fluid is introduced and which will flex back to its original shape when internal pressure is released.

When a container 17 is to be sealed, a fluid under pressure is injected into the interior 50 of the hollow bladder 29 through conduit 53. The pressure of the fluid is preferably low but is sufficient to re-shape the contours of the bladder so that it assumes the shape shown in FIGS. 5 and 6 and in dotted lines at F in FIG. 2. In this position the front wall 32 is pushed inwardly toward the container and impinges against the side walls of the container. It will be noted that there is no stretching of the walls and that the cross section of all the walls of the bladder 29 under pressure is substantially the same as the cross section while at rest. Thus the effective life of the bladder is lengthened by the fact that there is no stretching of the walls of the hollow bladder 29.

It is believed that there is no stretching of the walls because the bladder 29 as shown in solid lines in FIG. 2 has a generally rectangular cross-section. As a fluid is injected into the bladder 29, the volume increases, i.e. the front wall 32 gets shorter and the top and bottom portion 33 and 34 are lengthened, however the perimeter remains constant. Hence there is no stretching of the bladder 29. When there is no container, the bladder 29 assumes a circular configuration which is the maximum cross-sectional volume since the bladder tends to assume an equilateral configuration.

Furthermore, in view of the fact that the bladder will be re-shaped at low pressure, the friction between the bladder and the side walls of the container is low so that the bladder will not wear out.

If, for any reason, no container is in the sealing head A, or if a container is broken, so that the bladder does not make contact with the side walls of a container, the bladder 29 will bulge out and assume the shape shown in FIG. 7 and in dotted lines at G in FIG. 2. Here again there is no stretching of the side walls and in view of the fact that low pressures are used, there is no danger of the bladder being blown out by excessive pressure.

It will also be noted that the front wall 32 is resilient enough to conform to the shape of the side walls of the container 17, whether the side walls are straight, concave or convex, inwardly or outwardly tapered, or any other shape.

The operation of the device will be obvious from the above description. The plunger 12 is in its elevated position and a closure cap 16 is held in an elevated position by the magnet 9 within the friction boot 13. In this position as shown in FIGS. 3 and 4, the bladder 29 is at rest with its wall 32 spaced from the side walls of the container 17. When air is to be evacuated from the headspace of the container 17 a fluid under pressure is introduced into the bladder 29 to reshape the bladder so that the wall 32 presses against the side wall of the container 17 to seal the interior to the sealing head from the atmosphere. As pointed out above, there is no stretching of the side walls of the bladder but a mere re-shaping of the contours. In this position, as shown in FIGS. 5 and 6, the air can be evacuated from the headspace and inert gas or a condensable vapor substituted therein.

The plunger 12 is then lowered in order to position the closure cap 16 on the finish 15 of container 17 and the spindle is rotated to permit the lugs of the closure cap to cooperate with the threads 18 of the finish and form a hermetically sealed package.

As pointed out above, if there is no container underneath the sealing head A, the bladder will assume the bulged shape which is shown in FIG. 7 and since the air bladder operates at low pressure, there is no danger of the rubber being stretched until the bladder blows out.

It will thus be seen that the present invention provides an improved inflatable bladder which has a longer life, which operates at low pressures and is not subject to being blown out.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described our invention, we claim:

A container sealing head comprising a hood having a bladder-receiving wall, an annular hollow inflatable bladder extending from said wall, said bladder comprising a substantially flat front wall, curved connecting portions at the upper and lower edges of said front wall and extending rearwardly therefrom, holding means extending rearwardly from said curved portions, said holding means comprising flanges substantially normal to the front wall and integral with the curved portions and locking beads at the end of said flanges substantially parallel to the front wall and normal to said flanges, said bladder-receiving wall having spaced cavities therein adapted to receive and hold said beads and having a separator portion extending within said bladder between said cavities, said separator portion terminating adjacent to the point where the flanges of the bladder meet said curved portions thereof whereby the space between the front wall and said flanges is devoid of any part of said bladder-receiving wall, said curved connecting portions being adapted to be re-shaped and move toward each other when a fluid is introduced into the hollow bladder to move said front wall forward and cause it to assume a generally curved configuration, the cross-sectional thickness of said front wall before and after inflation of the bladder remaining substantially equal.

References Cited in the file of this patent
UNITED STATES PATENTS

| | | |
|---|---|---|
| 1,860,270 | Thubron | May 24, 1932 |
| 2,054,492 | Young | Sept. 15, 1936 |
| 2,120,272 | Williams et al. | June 14, 1938 |
| 2,670,117 | Kantor | Feb. 23, 1954 |
| 2,694,516 | Barnby et al. | Nov. 16, 1954 |
| 2,884,751 | Bjering | May 5, 1959 |